US012394547B2

(12) United States Patent
Park et al.

(10) Patent No.: US 12,394,547 B2
(45) Date of Patent: Aug. 19, 2025

(54) GRAIN-ORIENTED ELECTRICAL STEEL SHEET AND MANUFACTURING METHOD THEREFOR

(71) Applicant: POSCO, Pohang-si (KR)

(72) Inventors: Se-Min Park, Pohang-si (KR); Ju Seung Lee, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 1072 days.

(21) Appl. No.: 17/415,823

(22) PCT Filed: Dec. 18, 2019

(86) PCT No.: PCT/KR2019/018033
§ 371 (c)(1),
(2) Date: Jun. 18, 2021

(87) PCT Pub. No.: WO2020/130645
PCT Pub. Date: Jun. 25, 2020

(65) Prior Publication Data
US 2022/0051837 A1 Feb. 17, 2022

(30) Foreign Application Priority Data
Dec. 19, 2018 (KR) ........................ 10-2018-0165650

(51) Int. Cl.
*C21D 10/00* (2006.01)
*H01F 1/18* (2006.01)
(Continued)

(52) U.S. Cl.
CPC ............. *H01F 1/18* (2013.01); *C21D 10/005* (2013.01); *C21D 2201/05* (2013.01); *H01F 27/2455* (2013.01); *H01F 41/024* (2013.01)

(58) Field of Classification Search
CPC .. C21D 10/00; C21D 10/005; C21D 2201/05; C21D 8/1294; C21D 9/46; H01F 1/16; H01F 1/18; H01F 27/2455; H01F 41/024
See application file for complete search history.

(56) References Cited

U.S. PATENT DOCUMENTS 4,915,749 A * 4/1990 Fukuda ................ C21D 8/1294 219/121.36
4,963,199 A 10/1990 Pavlik et al.
(Continued)

FOREIGN PATENT DOCUMENTS

BR 112013002874 A2 5/2016
CN 103097563 A 5/2013
(Continued)

OTHER PUBLICATIONS

Office Action issued Jun. 23, 2023 for corresponding Chinese Patent Application No. 201980083528.0.
(Continued)

*Primary Examiner* — Nicholas A Wang
(74) *Attorney, Agent, or Firm* — Morgan Lewis & Bockius LLP

(57) ABSTRACT

A grain-oriented electrical steel sheet includes a plurality of linear deformable portions formed on a surface of the electrical steel sheet in a rolling direction, wherein an interval between the deformable portions changes to correspond to a grain size of grains over the entire length of the steel sheet, and at least two regions in which intervals between the deformable portions are different exist.

12 Claims, 10 Drawing Sheets

(51) Int. Cl.
*H01F 27/245* (2006.01)
*H01F 41/02* (2006.01)

(56) References Cited

U.S. PATENT DOCUMENTS

| | | | | | |
|---|---|---|---|---|---|
| 2013/0139932 | A1* | 6/2013 | Sakai | H01F 41/0206 148/307 |
| 2015/0034211 | A1* | 2/2015 | Takajo | C21D 1/34 148/306 |

FOREIGN PATENT DOCUMENTS

| | | | |
|---|---|---|---|
| CN | 104011241 | A | 8/2014 |
| EP | 0287357 | A2 | 10/1988 |
| EP | 2599883 | A1 | 6/2013 |
| EP | 2796583 | A1 | 10/2014 |
| JP | S63-262421 | A | 10/1988 |
| JP | H06-100997 | A | 4/1994 |
| JP | H07-320921 | A | 12/1995 |
| JP | H07320921 | * | 12/1995 |
| JP | H08-145953 | A | 6/1996 |
| JP | H09251009 | * | 9/1997 |
| JP | 2007-146244 | A | 6/2007 |
| JP | WO2013/094218 | A1 | 4/2015 |
| JP | 6761375 | B2 | 8/2015 |
| KR | 10-0658197 | B1 | 12/2006 |
| KR | 10-2011-0063187 | A | 6/2011 |
| KR | 10-2014-0103973 | A | 8/2014 |
| KR | 10-2014-0103995 | A | 8/2014 |
| KR | 10-2014-0109409 | A | 9/2014 |
| KR | 10-2016-0053712 | A | 5/2016 |
| KR | 10-2017-0074608 | A1 | 6/2017 |
| KR | 10-1913367 | B1 | 10/2018 |
| WO | 2012/014290 | A1 | 2/2012 |

OTHER PUBLICATIONS

International Search Report (with partial translation) and Written Opinion dated Apr. 13, 2020, issued in corresponding International Patent Application No. PCT/KR2019/018033.

Extended European Search Report dated Feb. 9, 2022 issued in European Patent Application No. 19900253.6.

* cited by examiner

GRAIN-ORIENTED ELECTRICAL STEEL SHEET AND MANUFACTURING METHOD THEREFOR

CROSS-REFERENCE OF RELATED APPLICATIONS

This application is the U.S. National Phase under 35 U.S.C. § 371 of International Application No. PCT/KR2019/018033 filed on Dec. 18, 2019, which claims the benefit of Korean Application No. 10-2018-0165650 filed on Dec. 19, 2018, the entire contents of each are hereby incorporated by reference.

TECHNICAL FIELD

The present invention relates to a grain-oriented electrical steel sheet and a manufacturing method therefor, and more particularly, to a method for manufacturing a grain-oriented electrical steel sheet having improved magnetism by adjusting an interval of a deformable portion to correspond to a grain size of grains of a steel sheet.

BACKGROUND ART

A grain-oriented electrical steel sheet having excellent magnetic characteristics is generally used as an iron core material for transformers, in which a Goss texture specialized in a <001> direction is formed on the entire steel sheet through a special rolling process that only electrical steel sheet has.

The Goss texture is a texture specialized in terms of magnetism of a fixing element. In the case of a grain-oriented electrical steel sheet field, efficiency improvement when using the grain-oriented electrical steel sheet is the biggest issue. The issue is in line with the measures to reduce energy loss that has emerged due to the global energy problem. Therefore, iron loss and magnetic flux density, that is, magnetic properties, which represent efficiency, are important factors.

Also, in order to ensure excellent magnetic properties, it is necessary to maintain optimal conditions in each process, and one of the factors necessary to maintain the optimal conditions is a grain size of the grains formed in a steel sheet structure.

Magnetic properties of the electrical steel sheet are affected by a size and direction of a magnetic domain, and the magnetic domain is affected by the grain size of the grains. Here, several magnetic domains may be formed by a domain wall even in one grain, and one grain (a single crystal within a grain boundary) may form a single domain. In addition, even two or more grains may form a single domain if they have similar crystal orientations, but for the convenience of explanation, it is assumed that a single grain forms a single domain. Therefore, in the following, the expression “grain” may refer to either a grain itself metallographically or may refer to a single magnetic domain magnetically.

Refining a magnetic domain in an electrical steel sheet refers to a process of separating a grain having magnetic domain properties into several magnetic domains by applying a physical stimulus thereto. The magnetic domain refinement process may be performed before a decarburization process or may be performed even after insulation coating. In either case, it is necessary to measure refined magnetic domains (i.e., grains) during the manufacturing process, and here, the magnetic domains may be physically distinguished from each other but it is not easy to measure a size of the grains in a state of being insulated and coated on a surface of the steel sheet. In addition, in the case of measuring the size of the grains in real time during the manufacturing process, reactivity of a measuring sensor needs to be fast.

In a generally known method for measuring grains, grains are measured by immersing the steel sheet in a hydrochloric acid. Since an energy difference between an inside of the grains and a grain boundary is large, when the steel sheet is immersed in the hydrochloric acid, an etching rate at the grain boundary side is fast, and thus, when the steel sheet is checked after the lapse of a certain time, a tile pattern appears due to a difference in an etch amount. The method using the hydrochloric acid is able to measure a grain size clearly and is commonly used, but there are environmental factors such as the need for an etching time for the hydrochloric acid and the use of an acid. Therefore, there is a limitation to use the method in an insulation-coated electrical steel sheet in a non-destructive manner and in real time.

DISCLOSURE

Technical Problem

The present invention has been made in an effort to provide a grain-oriented electrical steel sheet and a manufacturing method therefor, and more particularly, a method for manufacturing a grain-oriented electrical steel sheet having advantageous of improving magnetism by adjusting an interval of a deformable portion to correspond to a grain size of grains of a steel sheet.

Technical Solution

An exemplary embodiment of the present invention provides a grain-oriented electrical steel sheet including: a plurality of linear deformable portions formed on a surface of the electrical steel sheet in a rolling direction, wherein an interval between the deformable portions may change to correspond to a grain size of grains over the entire length of the steel sheet, and at least two regions in which intervals between the deformable portions are different may exist.

The steel sheet may be divided into sections in a width direction (TD direction) of the steel sheet, and intervals between the deformable portions may be formed to be different in each section according to a grain size of grains included in each section.

The steel sheet may be divided into sections in a rolling direction (RD direction) of the steel sheet, and intervals between the deformable portions are different in each section according to a grain size of grains included in each section.

A grain size (x, mm) of grains and an interval (y, mm) between the deformable portions may satisfy Equation 1 below.

$$y-2 \leq 8.943-0.45x+0.011x^2 \leq y+2. \quad \text{[Equation 1]}$$

The linear deformable portion may include a temporary magnetic domain deformable portion, a permanent magnetic domain deformable portion, or a combination thereof.

The linear deformable portion may include a permanent magnetic domain deformable portion, and a depth of the permanent magnetic domain portion is 3 to 30 μm.

Another exemplary embodiment of the present invention provides a method for refining a magnetic domain of a grain-oriented electrical steel sheet, including: measuring a grain size of grains of a steel sheet; and forming a linear deformable portion by determining an interval based on the measured grain size value of the grain, wherein a deformable portion is formed so that at least two regions in which intervals between the deformable portions are different may exist.

The steel sheet may be divided into sections in a width direction of the steel sheet, and intervals between the deformable portions may be formed to be different in each section according to average grain sizes of the grains included in each section. T The steel sheet may be divided into sections in a rolling direction of the steel sheet, and intervals between the deformable portions may be formed to be different in each section according to average grain sizes of the grains included in each section.

A grain size (x, mm) of grains and an interval (y, mm) between the deformable portions may satisfy Equation 1 below.

$$y-2\leq 8.943-0.45x+0.011x^2\leq y+2 \quad \text{[Equation 1]}$$

The measuring of the grain size of the grain of the steel sheet may include: applying magnetism to a surface of the steel sheet to magnetize the steel sheet, detecting leakage magnetic flux formed by a grain boundary, and calculating the detected leakage magnetic flux to measure a grain size.

The forming of the linear deformable portion may include irradiating the steel sheet with one or more of a laser, an electron beam, or plasma; performing etching using an acid; or causing particles to collide with each other.

The forming of the linear deformable portion may include irradiating the steel sheet with a laser to form a temporary magnetic domain deformable portion.

Yet another exemplary embodiment of the present invention provides an apparatus for refining a magnetic domain of a grain-oriented electrical steel sheet, including: a grain size measurement device measuring a grain size of grains of a steel sheet and transmitting a measurement result to a deformable portion controller; a deformable portion controller receiving the grain size value from the grain size measurement device and determining an interval between the deformable portions; and a deformable portion formation device forming a deformable portion on a surface of a steel sheet at the interval determined by the deformable portion controller.

The grain size measurement device may include a magnetizer applying magnetism to the surface of the steel sheet to magnetize the steel sheet; and a magnetic sensor detecting a leakage magnetic flux formed by a grain boundary.

Two to nine deformable portion formation devices may be installed in a width direction of the steel sheet, and each device may form a deformable portion on the surface of the steel sheet at the interval determined by the deformable portion controller.

According to an implementation example of the present invention, magnetism may be improved by performing optimal magnetic domain refinement.

MODE FOR INVENTION

Figure 1:
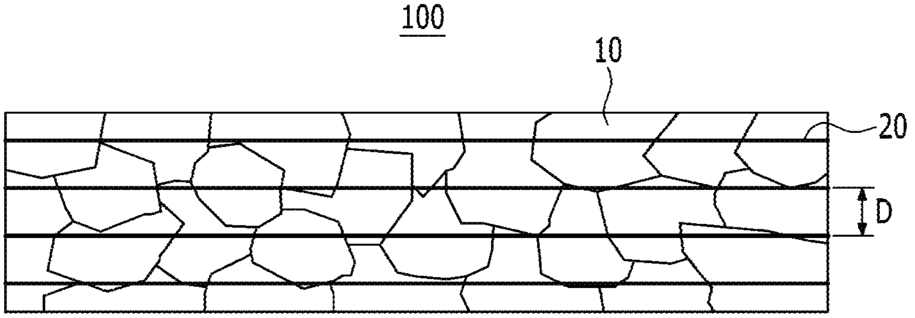
FIG. 1 is a schematic view showing a deformable portion formation interval in the case of a small grain size.

Although terms such as first, second, and third are used for describing various parts, various components, various areas, and/or various sections, the present disclosure is not limited thereto. Such terms are used only to distinguish any part, any component, any area, any layer, or any section from the other parts, the other components, the other areas, the other layers, or the other sections. Thus, a first part, a first component, a first area, a first layer, or a first section which is described below may be mentioned as a second part, a second component, a second area, a second layer, or a second section without departing from the scope of the present disclosure.

Here, terminologies used herein are merely used to describe a specific exemplary embodiment, and are not intended to limit the present disclosure. A singular form used herein includes a plural form as long as phrases do not express a clearly opposite meaning. The term "include" used in the specification specifies specific characteristics, a specific area, a specific essence, a specific step, a specific operation, a specific element, and/or a specific ingredient, and does not exclude existence or addition of the other characteristics, the other area, the other essence, the other step, the other operation, the other element, and/or the other ingredient.

When it is mentioned that a first component is located "above" or "on" a second component, the first component may be located directly "above" or "on" the second component or a third component may be interposed therebetween. In contrast, when it is mentioned that a first component is located "directly above" a second component, a third component is not interposed therebetween.

Although not otherwise defined, all terms used herein, including technical terms and scientific terms, have the same meanings as those generally understood by those skilled in the art to which the present disclosure pertains. Terms defined in a generally used dictionary are interpreted as meanings according with related technical documents and currently disclosed contents, and are not interpreted as ideal meanings or very formal meanings unless otherwise defined.

Hereinafter, exemplary embodiments of the present invention will be described in detail so that a person of ordinary skill in the art could easily carry out the present invention. As those skilled in the art would realize, the described exemplary embodiments may be modified in various different ways, all without departing from the spirit or scope of the present invention.

An exemplary embodiment of the present invention has an objective to improve magnetism by adjusting an interval of the deformable portions to correspond to a grain size of a steel sheet.

In the case of a grain-oriented electrical steel sheet, a manufacturing process is very complicated and there are various factors controlling a grain size of grains. Ideally, it is desirable to form grains having the same grain size over the entire length of the grain-oriented electrical steel sheet, but in reality, there are significant deviation in grain size in a width direction (TD direction) and a rolling direction (RD direction) of the steel sheet.

In the related art, in spite of the existence of such a grain size deviation in reality, the deformable portions of the same interval are formed mechanically. However, an exemplary embodiment of the present invention is to comprehensively improve magnetism of the electrical steel sheet by making grains (i.e., size of magnetic domain) of a final product uniform by variously modifying the interval between the deformable portions to correspond to the grain size of the grains, even if the size of the grain exists according to a change in conditions of a manufacturing process.

The grain-oriented electrical steel sheet according to an exemplary embodiment of the present invention includes a plurality of linear deformable portions 20 formed along a rolling direction on a surface of the electrical steel sheet, an interval D between the deformable portions is changed to correspond to a size of a grain 10 over the entire length of the steel sheet, and there are at least two regions in which intervals D between the deformable portions are different.

Figure 2:
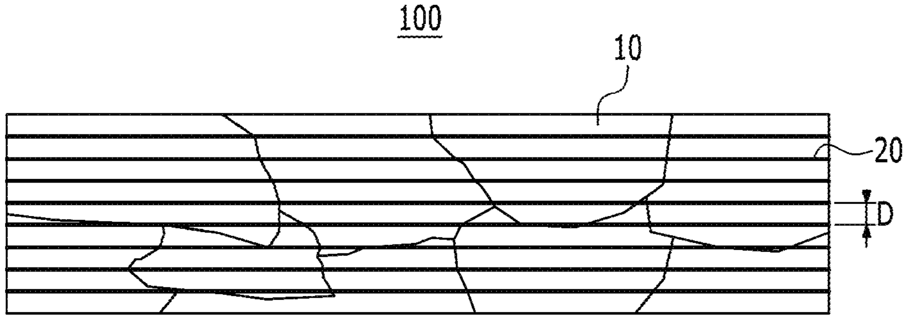
FIG. 2 is a schematic view showing a deformable portion formation interval in the case of a large grain size.

As shown in FIGS. 1 and 2, in an exemplary embodiment of the present invention, when a grain size is relatively small as shown in FIG. 1, the interval D between the deformable portions is relatively large. In addition, when the grain size is relatively large as shown in FIG. 2 in the same steel sheet, the interval D between the deformable portions is formed to be relatively small.

When the grain sizes are different, magnetic properties inside the grains are different, so internal structures called magnetic domains are different. That is, when the grain size is large, groups with similar magnetic domains are located large, and when the grain size is small, groups with similar magnetic domains are located small.

In the case of the grain-oriented electrical steel sheet, since a transformer using a grain-oriented electrical steel sheet is commonly used in a state in which directions of a magnetic field applied to a magnetic domain are continuously changed, the aforementioned contents are important.

More specifically, the transformer is normally used with an AC voltage, and a direction magnetization is changed through the AC voltage. In the case of AC, a direction of current and magnetic field changes over time, and if a grain size is large when the direction changes, loss thereof is significant. When the grain size of the grains is large, energy loss is large in moving the entire magnetic domain group in the direction of the magnetic field changed by the AC voltage, and thus, in order to reduce this, a size of the magnetic domain is reduced through magnetic domain refinement by applying a deformable portion.

Meanwhile, when the grain size is relatively small, there is no problem even if the magnetic domain refinement is performed with a relatively large interval D between the deformable portions, but, when the grain size is relatively large, it is necessary to reduce the interval D. If the magnetic domain is refined with a small distance D between the deformable portions although the grain size is small, a lot of magnetic domains that are not beneficial for magnetization may occur around a boundary, which may cause a problem of deterioration of iron loss. Thus, by changing the interval between the deformable portions to correspond to each grain size, magnetism may be further improved.

In an exemplary embodiment of the present invention, the grain size refers to a grain size based on a rolled surface (ND surface). Also, the grain size refers to a grain size of a virtual circle on the assumption of the virtual circle having the same area as the grain size.

It would be the most ideal to make all the intervals D of the deformable portions different for each grain, which, however, is practically difficult to implement in rapidly moving steel sheet facilities.

In an exemplary embodiment of the present invention, the steel sheet is divided into sections in the width direction (TD direction) of the steel sheet, and the interval D between the deformable portions 20 different for each section may be formed according to grain sizes of the grains 10 included in each section. Specifically, an average grain size of the grains 10 included in each section may be obtained, and the interval D between the deformable portions may be formed according to the average grain size. Specifically, the steel sheet may be divided into 2 to 9 sections with respect to the entire width of the steel sheet.

Figure 3:
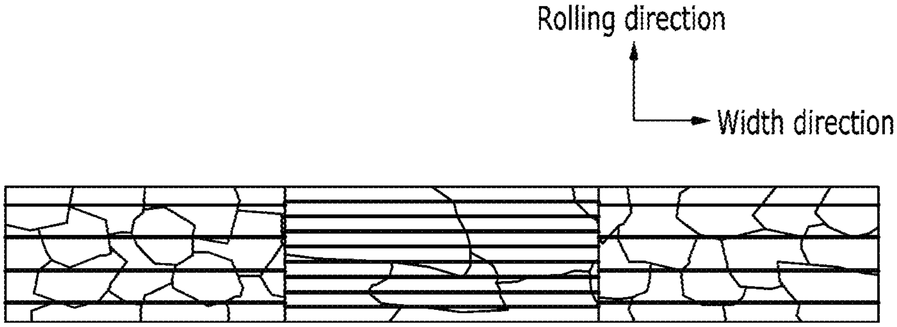
FIG. 3 is a schematic view in which a steel sheet is divided into sections in a width direction of the steel sheet to form different intervals between the deformable portions.

FIG. 3 shows a schematic diagram in which the steel sheet is divided in the width direction (TD direction) of the steel sheet to form different intervals between the deformable portions.

In an exemplary embodiment of the present invention, the steel sheet is divided into sections in the rolling direction (RD direction) of the steel sheet, and the intervals D between the different deformable portions 20 for each section are formed according to grain sizes of the grains 10 included in each section. Specifically, average grain sizes of the grains 10 included in each section may be obtained, and the intervals D between the deformable portions may be formed according to the average grain sizes. Specifically, the steel sheet may be divided at intervals of 1 to 50 cm in length with respect to the rolling direction (RD direction) of the steel sheet.

Figure 4:
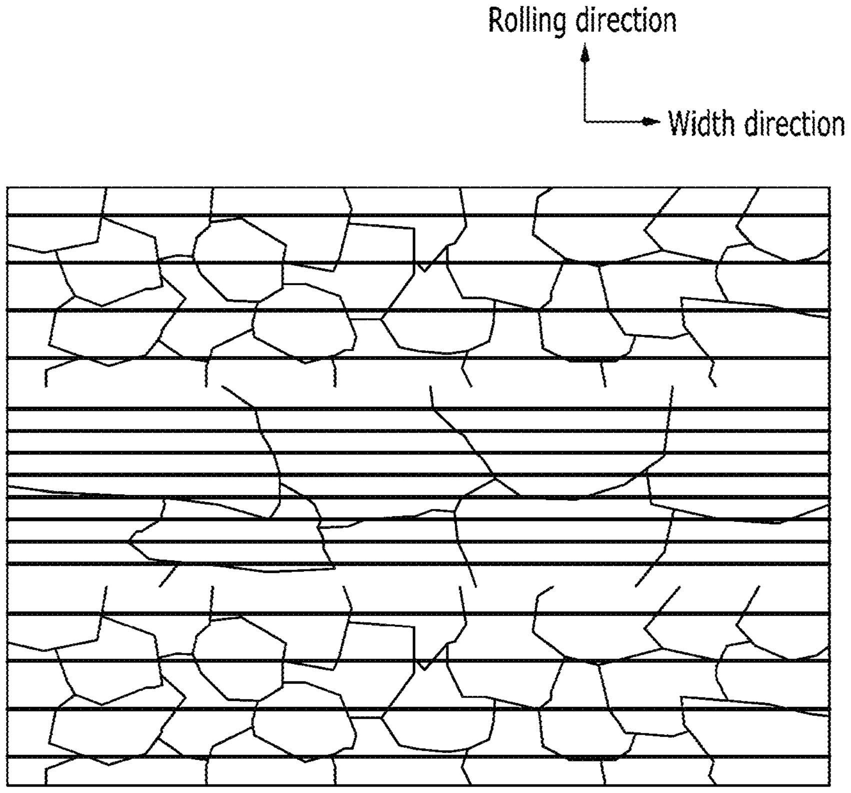
FIG. 4 is a schematic view in which a steel sheet is divided into sections in a rolling direction of the steel sheet and intervals between the deformable portions are formed to be different.

FIG. 4 shows a schematic diagram in which the steel sheet is divided into sections in the rolling direction (RD direction) of the steel sheet and intervals between the deformable portions are formed to be different. In FIGS. 3 and 4, it is illustrated that the grain sizes of the grains change rapidly for each section for explanation, but in an actual steel sheet, the grain sizes may change with a gradient before and after boundaries of the sections. It is also possible to divide the steel sheet into sections in the width direction (TD direction) and the rolling direction (RD direction) of the steel sheet, that is, in a lattice form, to form different intervals between the deformable portions.

The grain size (x, mm) of the grains and the interval (y, mm) between the deformable portions may satisfy Equation 1 below.

$$y-2 \leq 8.943-0.45x+0.011x^2 \leq y+2 \quad \text{[Equation 1]}$$

When Equation 1 is not satisfied, magnetism, in particular, iron loss characteristics, is significantly deteriorated.

As in the related art, when the interval D of the deformable portion is uniformly provided regardless of grain size, Equation 1 may not be satisfied due to the deviations of the grain sizes and iron loss characteristics may be deteriorated. More specifically, the value of Equation 1 may be included within a range of ±1.5 of y.

More specifically, the value of Equation 1 may be included within a range of ±1 of y. More specifically, the value of Equation 1 may be included within a range of ±0.5 of y. More specifically, the value of Equation 1 may be included within a range of ±0.1 of y.

The linear deformable portion may include a temporary magnetic domain deformable portion, a permanent magnetic domain deformable portion, or a combination thereof.

The temporary magnetic domain deformable portion is a deformable portion formed by refining the magnetic domain by applying a thermal shock to the surface of the steel sheet. The temporary magnetic domain deformable portion is indistinguishable from a surface of other steel sheets in appearance. The temporary magnetic domain deformable portion is a portion etched in the form of a groove when immersed in a hydrochloric acid with a concentration of 5% or more for 10 minutes or more, and may be distinguished from a portion of surfaces of other steel sheets.

The permanent magnetic domain deformable portion is a deformable portion obtained by refining the magnetic domain by forming a groove on the surface of the steel sheet.

A depth of the permanent magnetic domain deformable portion may be 3 to 30 μm.

The linear deformable portion may be formed to intersect the rolling direction.

It is possible that a length direction of the linear deformable portion and the rolling direction (RD direction) form an angle of 75° to 88°.

Magnetism may be further improved within the aforementioned angle range.

The linear deformable portion may be continuously formed or may be intermittently formed in the width direction (TD direction) of the steel sheet.

As described above, the grain size of the grains over the entire length of the steel sheet may be various to range from 3 mm to 25 mm.

A method for refining a magnetic domain of a grain-oriented electrical steel sheet according to an exemplary embodiment of the present invention includes measuring a grain size of grains of the steel sheet; and forming a linear deformable portion by determining an interval based on the measured grain size value. Hereinafter, each operation will be described in detail.

First, the grain size of the grains the steel sheet is measured. As a method for measuring the grain size in an exemplary embodiment of the present invention, any method that may measure the grain size in real time and reflect the measured grain size when forming a deformable portion, which will be described later, may be used without limitation. An acid immersion method, which is widely known as a conventional method for measuring a grain size, is inappropriate because a grain size cannot be measured in real time.

As an example of a method for measuring a grain size of a steel sheet, a magnetic flux leakage method may be used. Specifically, the measuring of a grain size may include applying magnetism to a surface of the steel sheet to magnetize the steel sheet, detecting a leakage magnetic flux formed by a grain boundary, and measuring a grain size by calculating the detected leakage flux.

In the grain, there is a difference in magnetic properties inside the grain and at the grain boundary. Due to this, when a magnetic sensor is located in a corresponding position, a magnitude of a measurement signal is significantly changed due to the change in the magnetic field at the grain boundary.

Figure 5:
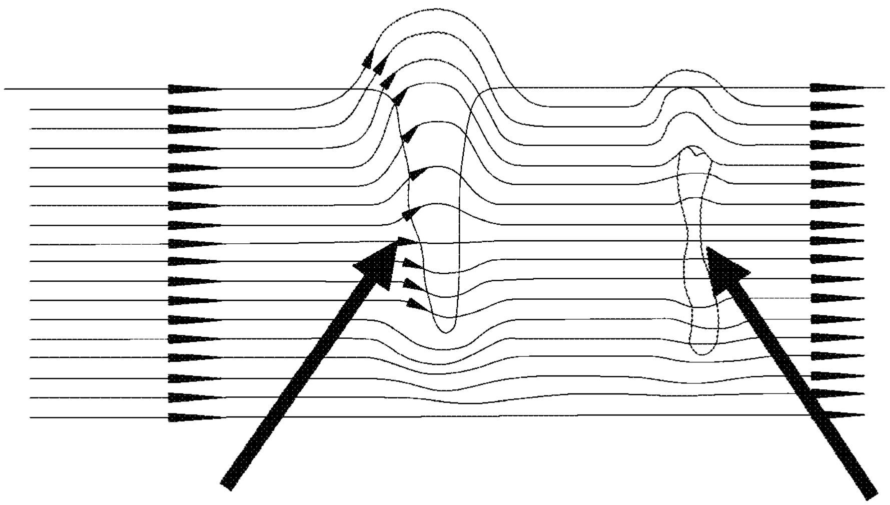
FIG. 5 is a schematic diagram illustrating a method for measuring a grain size according to an exemplary embodiment of the present invention.

FIG. 5 shows a change in magnetic field. The portions indicated by the arrows are portions in which the magnitude of the measurement signal is changed, and it may be measured as the presence of a grain boundary.

By using this, the grain size of the grains may be measured by measuring the boundary of the grains. In addition, when the sensors are arranged side by side in a direction perpendicular to a scan direction, the grains may be displayed in a high-resolution two-dimensional (2D) image according to an interval between the sensors, so that the grain sizes may be clearly distinguished.

In other words, the steel sheet is magnetized in a certain direction with a magnetizer (an electromagnet or a permanent magnet), and a magnetic field leaked to the outside due to defects existing in the steel sheet is measured with a magnetic sensor such as a Hall sensor or GMR to detect the defects. The magnetic field generated in the magnetizer magnetizes the ferromagnetic steel sheet in a specific direction, and the magnetic field flows uniformly in an internal region the grains, but leakage magnetic flux occurs at the grain boundary and a vertical component of the leaked magnetic flux is measured by magnetic sensor such as a Hall sensor, etc.

Figure 6:
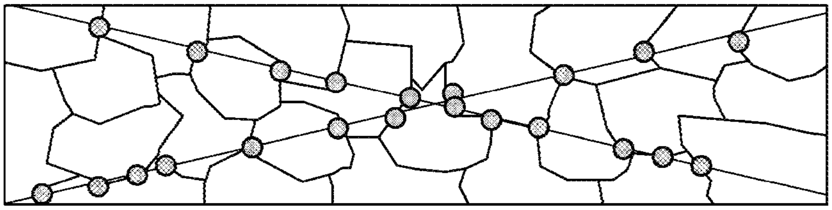
FIG. 6 is a schematic diagram illustrating a method for measuring a grain size according to an exemplary embodiment of the present invention.

A method for obtaining a grain size of a grain from the measured grain boundary includes various methods such as an area measurement method and an overlapping portion measurement method, and is not particularly limited. For example, in the area measurement method, a certain line may be drawn in a certain area, the number of regions that meet the grain boundary may be measured, and the measured number of regions may be divided by the total area so as to be converted, thus obtaining a grain size. FIG. 6 is a schematic view thereof. In FIG. 6, two lines are drawn diagonally in a certain area, and the number of regions (portions indicated by the circles) that meet the grain boundary is measured and converted.

Next, a linear deformable portion is formed by determining an interval based on the measured grain size value.

As described above, by dividing the steel sheet into sections in the width direction, the rolling direction, or the width direction and the rolling direction of the steel sheet, intervals between the deformable portions are different for each section may be formed according to average grain sizes measured for each section.

In addition, the grain size (x, mm) of the grains and the interval (y, mm) between the deformable portions may satisfy the following Equation 1.

$$y-2 \leq 8.943-0.45x+0.011x^2 \leq y+2 \quad \text{[Equation 1]}$$

Various methods may be used without limitation as a method for forming the linear deformable portion. Specifically, the deformable portion may be formed by irradiating the steel sheet with one or more of a laser, an electron beam, or plasma, performing etching using an acid, or colliding particles.

In addition, the forming of the linear deformable portion may include forming a temporary magnetic domain deformable portion by irradiating the steel sheet with a laser.

As an example, in the method for irradiating the steel sheet with a laser, energy density (Ed) of the laser may be 0.5 to 2 J/mm$^2$. If the energy density is too small, a groove 20 having an appropriate depth may not be formed and it is difficult to obtain an effect of improving iron loss. Conversely, even when the energy density is too large, it is difficult to obtain an effect of improving iron loss.

A beam length L of a laser in the width direction (TD direction) of the steel sheet may be 300 to 5000 μm. If the beam length L in the width direction (TD direction) is too short, a time for laser irradiation may be too short to form an appropriate deformable portion and it is difficult to obtain an effect of improving iron loss. Conversely, if the beam length L in the rolling vertical direction (TD direction) is too long, a time for laser irradiation is too long and a deformable portion having a too thick depth may be formed, and it is difficult to obtain an effect of improving iron loss.

A beam width W of the laser in rolling direction (RD direction) of the steel sheet may be 10 to 200 μm.

If the beam width W is too short or long, the width of the deformable portion may be short or long and it may not be possible to obtain an appropriate domain refining effect.

The type of laser beam is not particularly limited, and a single fiber laser may be used.

Figure 7:
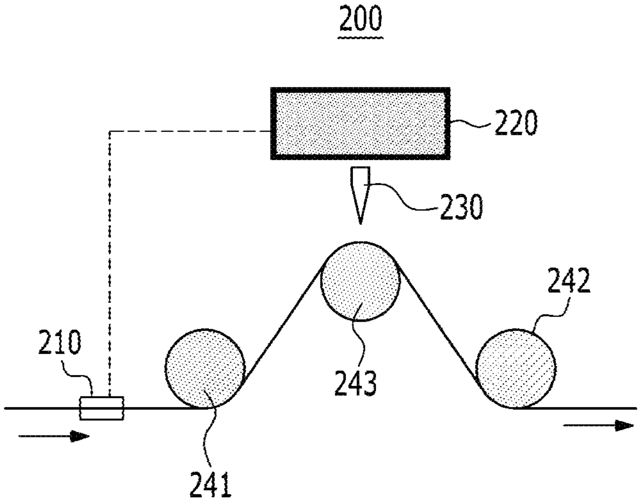
FIG. 7 is a view schematically showing an apparatus for refining a magnetic domain of a grain-oriented electrical steel sheet according to an exemplary embodiment of the present invention.

FIG. 7 shows an apparatus 200 for refining a magnetic domain of a grain-oriented electrical steel sheet according to an exemplary embodiment of the present invention. The apparatus 200 for refining a magnetic domain of a grain-oriented electrical steel sheet of FIG. 7 is only for illustrating the present invention, and the present invention is not limited thereto. Therefore, the apparatus 200 for refining a magnetic domain of a grain-oriented electrical steel sheet may be variously modified.

As shown in FIG. 7, the apparatus 200 for refining a magnetic domain of a grain-oriented electrical steel sheet according to an exemplary embodiment of the present invention may include a grain size measurement device 210 measuring a grain size of the grains 10 of the steel sheet and transmitting a result to a deformable portion controller 220; the deformable portion controller 220 receiving the grain size value of the grains from the grain size measurement device 210 and determining an interval between the deformable portions; and a deformable portion formation device 230 forming a deformable portion on a surface of the steel sheet at the interval determined by the deformable portion controller 220.

Hereinafter, each component will be described in detail.

As shown in FIG. 7, the steel sheet moves in a direction of the arrow, and is switched toward a steel sheet support roll 243 by deflector rolls 241 and 242. The grain size measurement device 210 measures the grain size of the grains 10 of the steel sheet and transmits the result to the deformable portion controller 220. As described in the method for refining a magnetic domain of a grain-oriented electrical steel sheet described above, any device may be used as the grain size measurement device 210 without a limitation as long as the device may be able to measure the grain size in real time and the deformable portion formation device 230, to be described later, may reflect the measured grain size. As an example, a device to which a magnetic flux leakage method is applied may be used.

Figure 8:
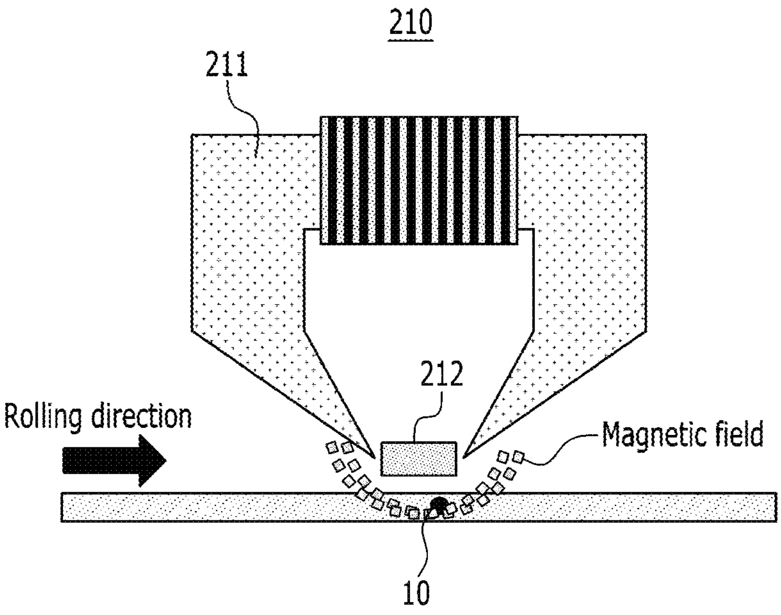
FIG. 8 is a view schematically showing a grain size measurement device according to an exemplary embodiment of the present invention.

FIG. 8 schematically shows an example of the grain size measurement device 210. As shown in FIG. 8, the grain size measurement device 210 may include a magnetizer 211 applying magnetism to a surface of the steel sheet to magnetize the steel sheet and a magnetic sensor 212 detecting leakage magnetic flux formed by grain boundaries Since a measurement principle of the grain size measurement device 210 has been described above, the overlapping description will be omitted.

The deformable portion controller 220 receives the grain size value from the grain size measurement device 210 and determines an interval between the deformable portions. Since the principle of determining the interval between the deformable portions has been described above, the overlapping description will be omitted.

Any device which may be able to form a deformable portion on the surface of the steel sheet may be used as the deformable portion formation device 230 may be used without limitation. In FIG. 7, a laser, electron beam, or plasma irradiation device is shown as an example. In addition, acid etching or particle collision devices may also be used.

Hereinafter, the present invention will be described in more detail through examples. However, these examples are only for illustrating the present invention, and the present invention is not limited thereto.

Experimental Example 1—Derivation of Optimal Interval According to Grain Size A specimen having a size of 20 cm×10 cm was prepared. Average grain sizes in the specimens were 6.59 mm (specimen 1), 10.2 mm (specimen 2), and 18.7 mm (specimen 3), respectively, and a constant specimen with little deviation in grain size was prepared.

Each specimen was formed by changing the interval between the deformable portions to 3 to 7 mm, and iron loss (17/50) thereof was measured and is shown in Table 2 below.

For the deformable portion, an ND fiber laser of 1500 W based on 100 mpm was used.

Figure 9:
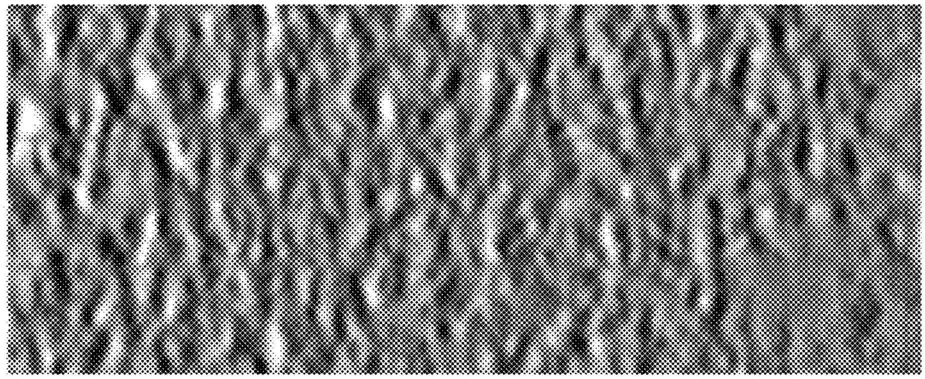
FIGS. 9 and 10 are results of grain size measurement by a method according to an exemplary embodiment of the present invention.
Figure 10:
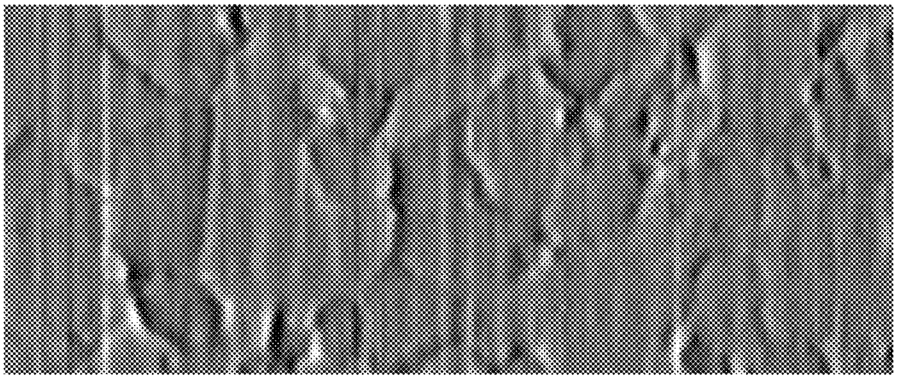

FIGS. 9 and 10 show photos obtained by analyzing grains in specimen 1 and specimen 3 by a magnetic flux leakage method, respectively.

TABLE 1

| | Specimen 1 | Specimen 2 | Specimen 3 |
|---|---|---|---|
| grain size | 6.59 mm | 10.2 mm | 18.7 mm |
| Equation 1 value | 6.46 | 5.50 | 4.34 |

TABLE 2

| Interval of deformable portion (mm) | Specimen 1 | Specimen 2 | Specimen 3 |
|---|---|---|---|
| 3 | 0.825 | 0.774 | 0.771 |
| 3.5 | 0.795 | 0.787 | 0.770 |
| 4 | 0.800 | 0.773 | 0.752 |
| 4.5 | 0.796 | 0.768 | 0.710 |
| 5 | 0.781 | 0.733 | 0.726 |
| 5.5 | 0.791 | 0.714 | 0.750 |
| 6 | 0.784 | 0.762 | 0.756 |
| 6.5 | 0.737 | 0.790 | 0.792 |
| 7 | 0.784 | 0.792 | 0.793 |

As shown in Table 2, it can be seen that, when the value of Equation 1 is within the range of ±1 of the interval of the deformable portion, iron loss is excellent compared to the other cases. Among them, iron loss is superior within the range of ±0.5.

Experimental Example 2

Specimens having various grain sizes in the range of 3 to 25 mm were prepared.

The specimen was divided into regions and deformable portions were formed by adjusting an interval therebetween to satisfy the range of ±0.1 of the value of Equation 1 for each region, and this was used as an example.

In Comparative Examples 1 to 3, the intervals between the deformable portions were collectively applied to 4.5 mm, 5.5 mm, and 6.5 mm, respectively. Iron loss (W17/50) of Examples and Comparative Examples 1 to 3 was measured and shown in Table 3 below.

TABLE 3

| | Interval of deformable portion | Iron loss (W17/50, W/kg) |
|---|---|---|
| exemplary embodiment | Variously applied within range of 4 mm to 8 mm | 0.720 |
| Comparative Example 1 | 4.5 mm was collectively applied | 0.758 |
| Comparative Example 2 | 5.5 mm was collectively applied | 0.752 |
| Comparative Example 3 | 6.5 mm was collectively applied | 0.792 |

As shown in Table 3, it can be seen that the exemplary embodiment in which the interval between the deformable portions were appropriately controlled according to the grain size is significantly improved in iron loss compared to Comparative Examples 1 to 3.

It will be understood by those of ordinary skill in the art that various changes in form and details may be made herein without departing from the spirit and scope of the present invention as defined by the following claims and their equivalents. It will be understood that the invention may be practiced. It is therefore to be understood that the above-described exemplary embodiments are illustrative in all aspects and not restrictive.

DESCRIPTION OF SYMBOLS

100: grain-oriented electrical steel sheet,
10: grain,
20: deformable portion,
200: apparatus for refining magnetic domain,
210: grain size measurement device,
220: deformable portion controller,
230: deformable portion formation device

The invention claimed is:

1. A grain-oriented electrical steel sheet comprising:

a plurality of linear deformable portions formed on a surface of the electrical steel sheet in a rolling direction, wherein an interval between the deformable portions changes depending on a grain size of grains over an entire length of the steel sheet such that the interval is wider when the grain size is smaller and the interval is narrower when the grain size is larger, and at least two regions in which intervals between the deformable portions are different exist, wherein a grain size (x, mm) of grains and an interval (y, mm) between the deformable portions satisfy Equation 1 below:

$$y-2 \leq 8.943-0.45x+0.011x2 \leq y+2. \quad \text{[Equation 1]}$$

2. The electrical steel sheet of claim 1, wherein:

the steel sheet is divided into sections in a width direction of the steel sheet, and intervals between the deformable portions are formed to be different in each section according to a grain size of grains included in each section.

3. The electrical steel sheet of claim 1, wherein:

the steel sheet is divided into sections in a rolling direction of the steel sheet, and intervals between the deformable portions are different in each section according to a grain size of grains included in each section.

4. The electrical steel sheet of claim 1, wherein:

the linear deformable portion includes a temporary magnetic domain deformable portion, a permanent magnetic domain deformable portion, or a combination thereof.

5. The electrical steel sheet of claim 4, wherein:

the linear deformable portion includes a permanent magnetic domain deformable portion, and a depth of the permanent magnetic domain portion is 3 to 30 μm.

6. A method for refining a magnetic domain of the grain-oriented electrical steel sheet according to claim 1, the method comprising:

measuring a grain size of grains of a steel sheet; and forming a linear deformable portion by determining an interval based on the measured grain size value of the grain, wherein a deformable portion is formed so that at least two regions in which intervals between the deformable portions are different exist.

7. The method for claim 6, wherein:

the steel sheet is divided into sections in a width direction of the steel sheet, and intervals between the deformable portions are different in each section according to average grain sizes of the grains included in each section.

8. The method for claim 6, wherein:

the steel sheet is divided into sections in a rolling direction of the steel sheet, and intervals between the deformable portions are different in each section according to average grain sizes of the grains included in each section.

9. The method for claim 6, wherein:

a grain size (x, mm) of grains and an interval (y, mm) between the deformable portions satisfy Equation 1 below:

$$y-2 \leq 8.943-0.45x+0.011x2 \leq y+2. \quad \text{[Equation 1]}$$

10. The method for claim 8, wherein:

applying magnetism to a surface of the steel sheet to magnetize the steel sheet, detecting leakage magnetic flux formed by a grain boundary, and calculating the detected leakage magnetic flux to measure a grain size.

11. The method for claim 8, wherein:

the forming of the linear deformable portion includes irradiating the steel sheet with one or more of a laser, an electron beam, or plasma; performing etching using an acid; or causing particles to collide with each other.

12. The method for claim 11, wherein:

The forming of the linear deformable portion includes irradiating the steel sheet with a laser to form a temporary magnetic domain deformable portion.

* * * * *